Feb. 11, 1930.

W. J. PLATTEN

REFRIGERATING COUNTER

Re. 17,586

Original Filed April 16, 1923

Witnesses:
W. Kwood
R. E. Weber

Inventor:
William J. Platten
By
Attorneys

Reissued Feb. 11, 1930 Re. 17,586

UNITED STATES PATENT OFFICE

WILLIAM J. PLATTEN, OF GREEN BAY, WISCONSIN, ASSIGNOR TO EMMETT PLATTEN, OF GREEN BAY, WISCONSIN

REFRIGERATING COUNTER

Original No. 1,552,949, dated September 8, 1925, Serial No. 632,387, filed April 16, 1923. Application for reissue filed September 6, 1927. Serial No. 217,864.

This invention relates to refrigerating counters.

Objects of this invention are to provide a refrigerating counter in which the refrigeration is secured directly by conduction from a refrigerating element in the counter top, in which there is no flow of refrigerant air around the articles to be cooled, in which the counter top itself, or a portion associated therewith, is maintained at a relatively low temperature, and in which there is no condensation from a traveling stream of refrigerant air.

Further objects are to provide a refrigerating counter in which the material or food may be openly and directly displayed on top of counter, kept cool, and free from flies, and be readily accessible for rapid selling, in which a minimum of insulation is required, and which may be easily kept in a clean and sanitary condition, and the refrigerating element of which may be easily installed in old counters.

Embodiments of the invention are shown in the accompanying drawings, in which.

Figure 1:
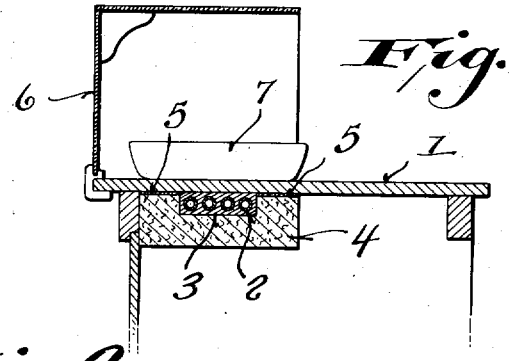
Figure 1 is a sectional view through one form of refrigerating counter, such view corresponding to a section on the line 1—1 of Figure 2.
Figure 2:
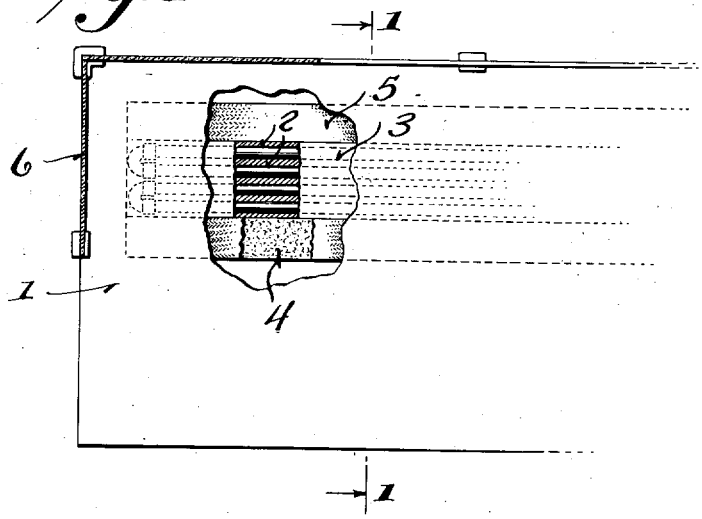
Figure 2 is a plan view of the structure shown in Figure 1 with parts broken away.

Figures 1 and 2 showing one form of the invention will first be described. The counter 1 in this form of the invention may consist of a slab of marble which is continuous from one side to the other. Beneath this counter a plurality of refrigerating pipes 2, through which any type of refrigerant may be passed, are located. These pipes are joined in a unitary structure by metal 3, which is preferably cast around the pipes to form a homogeneous unit, and to provide for the ready conduction of heat to the pipes. This metal is preferably of rectangular cross section, and of elongated contour as illustrated in Figures 1 and 2. It is held in a cork, lith or other thermal insulating case or packing 4 and if desired felt washers 5 may be positioned between such packing and the marble slab 1 on opposite sides of the metal block. Any desired support may be provided for the counter and preferably a transparent shield 6 extends partially thereover.

In using this counter, the containers 7 for the food or other material are placed directly upon the marble slab and over the metal block 3 as shown in Figure 1. The heat is readily conducted from these containers and from the food therein, downwardly through the slab and into the metal block and from thence through the pipes to the refrigerant.

It is to be noted that very little loss occurs in this type of construction as the insulation 4 adequately protects the metal block and cooling pipes therein.

Figure 3:
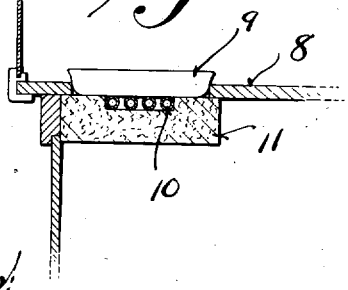
Figures 3 and 4 are views corresponding to Figure 1 showing different modifications.

Figure 3 shows a further form of the device in which the counter 8 is cut away to provide an aperture adapted to receive containers 9. These containers may directly contact with the cooling pipes 10, such pipes being carried within a channel formed in an insulating casing 11.

Figure 4:
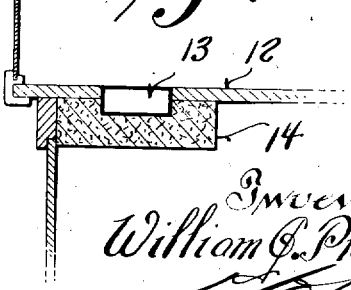

Figure 4 shows a further form of the device in which the counter 12 is cut away to provide a rectangular channel adapted to receive a rectangular casing 13 through which the cooling medium may pass. The upper portion of this casing 11, which is preferably of metal, is flush with the upper portion of the counter 12. The lower portion of the casing and also the adjacent portions of the counter are insulated by the elongated insulating member 14 in a manner similar to that previously described.

It will be seen that refrigerating counters have been provided which are of extremely effective design, which do not depend upon continuously circulating cold air with consequent condensation, which may be most readily installed, and which may be easily kept in a sanitary and clean condition.

Although a few forms of the invention have been described in considerable detail, it is to be understood that the invention may take various forms and is, therefore, to be limited only as set forth in the appended claims.

I claim:

1. A refrigerating counter comprising a permanently rigid slab upon which articles are adapted to be positioned, a series of refrigerating pipes positioned below said slab, an elongated channeled insulated sheath for receiving said pipes to thermally insulate them, and means for aiding in the rapid conduction of heat from said articles to said pipes.

2. A refrigerating counter, comprising a slab upon which articles are adapted to be placed, a metallic block positioned in contact with the lower portion of said slab and having a plurality of passages therethrough adapted for the circulation of a cooling medium, and an insulating casing recessed to receive said metallic block and positioned upon the under side of said slab.

3. A refrigerating counter comprising a marble top, an elongated permanent metallic member of rectangular cross section having a plurality of refrigerating pipes embedded therein; said member being positioned in contact with the under side of said marble top, and a thermally insulating casing completely surrounding the lower and side portions of said metallic member and positioned in contact with the under side of said marble top.

4. A refrigerating counter comprising a display surface formed by a material supporting means of a permanent nature adapted to support articles, and including refrigerating means adapted to cool such supporting means, means for aiding in the rapid transfer of heat by conduction from said articles to said refrigerating means and insulation for said refrigerating means and partially surrounding the same.

5. A refrigerating counter comprising a display surface formed by a material supporting means of a permanent nature adapted to support articles, and including refrigerating means adapted to cool such supporting means, means for aiding in the rapid transfer of heat by conduction from said articles to said refrigerating means and insulation for said refrigerating means partially surrounding the same, and means about such counter for preventing circulation of air about said material supporting means.

6. A refrigerating counter comprising a display surface formed by a permanently rigid material supporting means upon which articles are adapted to be positioned, and including a refrigerating conductor placed in close relation to such material supporting means and adapted to cool the same, and means for aiding in the rapid conduction of heat from said material supporting means to said refrigerating means.

7. A refrigerating counter comprising a permanently rigid slab upon which articles are adapted to be positioned, a series of refrigerating pipes positioned below said slab, an elongated channeled insulating sheath for receiving said pipes to thermally insulate them, and means for aiding in the rapid conduction of heat from said articles to said pipes, and means about such counter adapted to prevent the circulation of air about such material supporting means.

8. A refrigerating counter, comprising a slab upon which articles are adapted to be placed, a metallic block positioned in contact with the lower portion of said slab and having a plurality of passages therethrough adapted for the circulation of a cooling medium, and an insulating casing recessed to receive said metallic block and positioned upon the under side of said slab, and means about such counter adapted to prevent the circulation of air about such material supporting means.

Signed at Green Bay, county of Brown and State of Wisconsin, this 3rd day of September, 1927.

WILLIAM J. PLATTEN.